United States Patent [19]

Negura et al.

[11] Patent Number: 4,901,908
[45] Date of Patent: Feb. 20, 1990

[54] ALUMINUM MATERIAL FOR BRAZING, METHOD OF MANUFACTURING SAME, AND METHOD OF MANUFACTURING HEAT EXCHANGER MADE OF ALUMINUM ALLOY

[75] Inventors: Kengi Negura, Kariya; Ken Yamamoto, Obu; Shigeo Ito, Anjo; Masahiro Shimoya, Chita, all of Japan

[73] Assignee: Nippondenso Co., Ltd., Kariya, Japan

[21] Appl. No.: 240,639

[22] Filed: Sep. 6, 1988

[30] Foreign Application Priority Data

Sep. 9, 1987 [JP] Japan .................. 62-225880
Aug. 26, 1988 [JP] Japan .................. 63-212829

[51] Int. Cl.$^4$ .................. B23K 1/12; B23K 1/20
[52] U.S. Cl. .................. 228/183; 228/261; 228/226; 228/254; 228/56.3; 228/263.17; 165/905; 427/406; 427/423; 428/547; 428/577
[58] Field of Search ........ 228/183, 208, 261, 193–195, 228/225, 226, 254, 263.17, 56.3; 165/905; 427/406, 423; 428/547, 577

[56] References Cited

U.S. PATENT DOCUMENTS

| 4,732,311 | 3/1988 | Hasegawa et al. | 228/183 |
| 4,757,934 | 7/1988 | Greenstein | 228/261 |

FOREIGN PATENT DOCUMENTS

| 54641 | 5/1977 | Japan | 228/263.17 |
| 51950 | 4/1979 | Japan | 228/183 |
| 32872 | 2/1982 | Japan | 228/263.17 |
| 62858 | 4/1982 | Japan | 228/263.17 |
| 58-204169 | 11/1983 | Japan | 228/263.17 |
| 59-10467 | 1/1984 | Japan | 228/263.17 |
| 229280 | 12/1984 | Japan | 228/183 |
| 21176 | 2/1985 | Japan | 228/183 |
| 3662 | 1/1986 | Japan | 228/263.17 |
| 74771 | 4/1986 | Japan | 228/183 |
| 232060 | 10/1986 | Japan | 228/183 |
| 235072 | 10/1986 | Japan | 228/183 |

*Primary Examiner*—Richard K. Seidel
*Assistant Examiner*—Samuel M. Heinrich
*Attorney, Agent, or Firm*—Cushman, Darby & Cushman

[57] ABSTRACT

An aluminum material for brazing, comprising a core made of aluminum or an aluminum alloy, and a layer coated on the surface of the core. The layer is made of zinc or an alloy of zinc-and-aluminum and a brazing alloy having a melting point which is lower than that of the core by a predetermined value. The zinc or the alloy of zinc-and-aluminum and the brazing alloy have different melting points. Also disclosed are a method of manufacturing an aluminum material for brazing and a method of manufacturing an aluminum alloy heat exchanger by use of the Al material for brazing.

4 Claims, 2 Drawing Sheets

ALUMINUM MATERIAL FOR BRAZING, METHOD OF MANUFACTURING SAME, AND METHOD OF MANUFACTURING HEAT EXCHANGER MADE OF ALUMINUM ALLOY

BACKGROUND OF THE INVENTION

The present invention relates to an aluminum material for brazing, a method of manufacturing the same, and a method of manufacturing a heat exchanger of aluminum alloy which may be used as a condenser for an air conditioner of an automobile.

Conventional aluminum brazing material for use in a heat exchanger of the above-described type and a method of manufacturing the same are disclosed in Japanese Patent Laid-Open Publications Nos. 58-204169 and 59-10467.

In the former Publication, zinc is spray-coated on the surface of an extruded tube of aluminum alloy, and both this tube and corrugated fins- with a brazing material coated thereon are brazed in a furnace so as to produce a heat exchanger.

In the latter Publication, a brazing alloy of aluminum and silicon is sprayed on the surface of an extruded tube of aluminum alloy so as to produce the tube for a heat exchanger.

However, these techniques disclosed in the Japanese Patent Laid-Open Publications Nos. 58-204169 and 59-10467 suffer from the following problems: in a case where the brazing alloy of Al and Si is coated on an extruded multi-hole tube, a resultant aluminum alloy heat exchanger produced therefrom has poor corrosion resistance, even though excellent brazing is possible between the multi-hole tube and the corrugated fins. In contrast, in another case of coating Zn on such a multi-hole tube, a resultant heat exchanger produced therefrom has excellent corrosion resistance, but if fluoride type flux is used for the brazing, the zinc layer melts before the melting of the flux, so that it becomes impossible for the flux to reach the whole of the surfaces which are to be brazed, with the result that inferior brazing is apt to occur.

On the other hand, in a case where there is used a method of coating on an extruded tube an alloy of Al, Si and Zn which alloy contains a large amount of Zn, the whole of the alloy of Al, Si, and Zn melts at one melting point during the heating thereof for brazing before the Zn diffuses on the tube, so that the melted alloy is gathered in the vicinity of the contact portions of the tube and the fin with the result that the Zn contained in the alloy can not be well diffused over the whole of the tube.

SUMMARY OF THE INVENTION

Accordingly, an object of the present invention is to provide an aluminum material for brazing which material bring about both excellent corrosion resistance and good brazing when it is used as the material of an extruded multi-hole tube for use in a condenser or evaporator, and to provide a heat exchanger made by use of this aluminum material.

To achieve the object, the invention provides an aluminum material for brazing, comprising a core made of aluminum or an aluminum alloy, and a coating layer provided on the surface of said core, the coating layer consisting of one metal selected from the group of zinc and an alloy of zinc and aluminum, and another alloy for brazing which another alloy has a melting point lower than that of said core, the zinc or the alloy of zinc-and-aluminum and the another alloy for brazing having melting points different from one another. The alloy for brazing is selected preferably from the group of an Al-Si alloy and an Al-Si-Zn alloy. The coating layer is preferably provided with a gradient of Zn concentration so that a concentration of zinc existing in the vicinity of an interface defined between the core and the coating layer is larger than another concentration of zinc existing in the vicinity of a surface of the coating layer. The core is formed preferably by extrusion, the coating layer being provided preferably by spraying.

If the concentration of zinc of the surface of the coating layer is too high (about 40% or more), the melting point of the surface of the layer becomes lower than that of a fluoride type flux, causing the same problem as that which occurs in the case of conventional techniques. Further, if the concentration of zinc contained throughout the coated layer is as low as that of the zinc in the surface of the layer, sufficient resistance to corrosion cannot be obtained.

It is therefore preferable that the abovedescribed coating layer is composed of a first layer of Zn or an alloy of Zn and Al which first layer is provided on the surface of a core by spraying, and a second layer of a brazing alloy of Al and Si or a brazing alloy of Al, Si, and Zn which second layer is provided on the surface of the first layer by spraying.

The core may preferably be made of a metal selected from the group consisting of: pure aluminum of a type available on the market (e.g., A 1050 aluminum); an alloy of Al and Mn (e.g., A 3203 aluminum alloy); an alloy of Al, Mn, and Cu (e.g., A 3003 aluminum alloy); and an alloy of Al, 0.5% of Cu, and 0.15% of Mn. The alloy of Al and Zn coated on the core may preferably contain 30 to 95 wt % of Zn, and the balance Al and incidental impurities. It is preferable that the Zn used has a purity of 99 wt % or above. The alloy of Al and Si may preferably contain 5 to 11 wt % of Si, and the balance Al and incidental impurities. The alloy of Al, Si, and Zn may be preferably composed of 5 to 13 wt % of Si. 10 to 20 wt % of Zn, and the balance Al and incidental impurities. Corrugated fins are brazed to the tube produced by use of the material above-described to thereby produce an aluminum alloy heat exchanger. The corrugated fins may be preferably made of an alloy of Al and Mn (e.g., A 3003 aluminum alloy), or an alloy of Al, Mn, and Zn.

Regarding the steps of producing the coating layer comprising the first and second layers, at first Zn or an alloy of Zn and Al is cladded on an extruded multihole tube by spraying, and then an alloy of Al and Si or an alloy of Al, Si, and Zn is cladded on the surface of the first layer by spraying. This two-stage spraying may be performed by using two arc spray machines that are capable of spraying only one type of alloy or another spraying machine that is capable of spraying two kinds of alloys.

The first layer is formed by the spraying of Zn or an alloy of Zn and Al, because the Zn or an alloy of Zn and Al has a sacrifice corrosion-preventing property because of a lower electrode corrosion potential thereof. The second layer is formed by the spraying of a brazing alloy of Al and Si or another brazing alloy of Al, Si and Zn so that the second layer is used to braze the corrugated fin. In the heat exchanger of the present invention, no brazing material is cladded on the corrugated fins. Therefore, a buckling-resisting strength of the fins can thus be greatly increased, allowing a reduction in the wall thickness of the fin material to be made and the weight of the resultant heat exchanger to be reduced.

DESCRIPTION OF THE PREFERRED EMBODIMENTS

Figure 1:
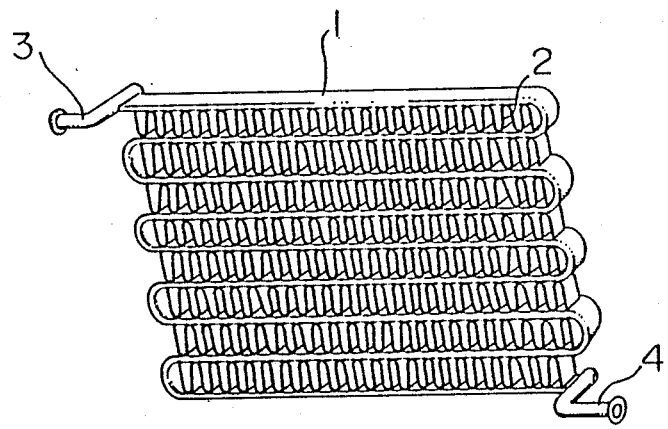
FIG. 1 is a perspective view of an aluminum alloy heat exchanger used as a condenser according to the present invention.
Figure 2:
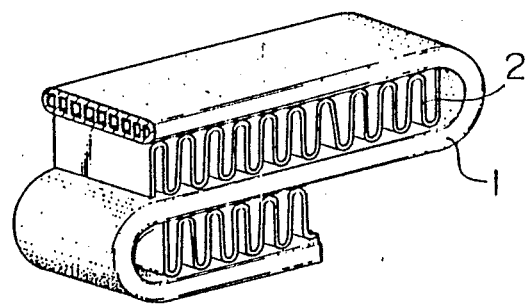
FIG. 2 is an enlarged perspective view of the essential parts of the heat exchanger of FIG. 1.

The present invention will be described below by example. In the example, the present invention is applied to the condenser for an automobile air conditioner shown in FIG. 1. As shown in FIG. 2, very thin corrugated fins 2 made of an aluminum alloy were inserted between multi-hole tubes 1. The multi-hole 1 and the fins 2 were brazed integrally to each other by using a second layer 1c made of an alloy of Al, Si, and Zn which alloy had been previously coated by the two-stage spraying. An inlet pipe coupling 3 and an outlet pipe coupling 4 were respectively brazed to the two openings of the multi-hole tube 1. A gas refrigerant whose temperature and pressure had been raised in a compressor (not shown) was introduced within the multi-hole tube 1. Heat exchange was conducted between the refrigerant and the air while the refrigerant was passing through the multi-hole tube 1, and a low-temperature, high-pressure liquid refrigerant was caused to flow out from the outlet pipe couple 4.

Steps of manufacturing the heat exchanger according to the present invention will be then described. Immediately after the multi-hole tube 1 had been extruded from an extruder 5, Zn or an alloy of Zn and Al was coated from above and below the multi-hole tube 1 by spray guns 7 so as to form a first layer 1b. Wire rods 71 and 72 of Zn or alloy of Zn and Al were supplied to each of the spray guns 7. Plus voltage and minus voltage were applied to the wire rods 71 and 72, respectively, so that an electric arc occurred therebetween which melted the wire rods. The molten metals of the wire rods were then blown onto the surface of the multi-hole tube 1 by use of compression air jetted from a nozzle 90 disposed between the wire rods 71 and 72. Next, a brazing alloy of Al, Si, and Zn or a brazing alloy of Al and Si was coated by spray guns 8 on the surface of the first layer 1b to form a second layer 1c. The spray guns 8 had the same structure as those of the spray guns 7. The multi-hole tube 1 having been produced in the above-described two-stage spraying was bent at predetermined lengths in zigzag shape to form a heat exchanger body. Subsequently, corrugated fins 2 were inserted and fixed between the zigzag multi-hole tubes 1 by use of a jig, and a fluoride type flux (e.g., a simple substance of $KAlF_4$, $K_2AlF_3$ or $K_3AlF_6$ or a mixture of at least two of them) was then coated on the surface of the assembly.

Next, the assembly was heated within a heating furnace whose temperature was maintained to the melting point of the flux or above for about 10 minutes so as to melt the second alloy layer of Al and Si or Al, Si, and Zn and thereby allow the multi-hole tube 1 and the fins 2 to be brazed to each other. Since the melting point of the first layer is lower than that of the second layer, the melting Zn alloy was made to diffuse into the core before the whole of the coated layers melted to form fillets, thereby improving the corrosion resistance of the tube.

Specific conditions of the two-stage spraying will be described below. The tube was extruded by the extruder 5 at a rate of about 20 to 40 m/min. The spraying was conducted to the tube immediately after extrusion while the tube was still hot due to extrusion (at a temperature of 350° C. or above). This was effected because the sprayed metal was able to easily adhere to the surface of the multi-hole tube 1 when the surface of the multi-hole tube 1 was not substantially oxidized and was still activated by the heat of the extrusion. This problem of oxidation of the surface of the multi-hole tube 1 can be eliminated, if the extrusion is performed in the inert atmosphere or vacuum. Zn or an alloy of Zn and Al was coated by the spray guns 7 to a thickness of about 2 to 10 $\mu$m so as to form the first layer 1b. If the thickness of the first layer is less than 2 $\mu$m, the Zn diffused layer which is effective for corrosion resistance can not be formed to a sufficient degree. If the thickness exceeds 10 $\mu$m, corrosion resistance rather reduces due to self-corrosion of the Zn layer. Further, the brazing material of the second layer 1c was coated to a thickness of 30 to 50 $\mu$m. A second layer 1c having a thickness of less than 30 $\mu$m cannot provide sufficient brazing of the corrugated fins 2. A second layer 1c having a thickness of 50 $\mu$m or above generates cracks in the multi-hole tube 1 when it is bent in zigzag shape. Table 1 shows the materials or the chemical composition for the multi-hole tube 1, fins and the coated layers, as well as the brazing ability and the corrosion resistance of the heat exchanger manufactured from these components.

TABLE 1

Evaluations of Capability of Brazing and Corrosion Resistance
Resistance (with fins having a wall thickness of 0.14 mm)

| No. | Material of Multi-hole tube | Chemical Composition (wt %) and Thickness ($\mu$m) of First layer | | | Chemical Composition (wt %) and Thickness ($\mu$m) of Second layer | | | | Chemical Composition (wt %) of Material of Fins (wt %) | Capability of Brazing | Corrosion Resistance |
|---|---|---|---|---|---|---|---|---|---|---|---|
| | | Zn | Al | Thickness | Al | Si | Zn | Thickness | | | |
| The Present Invention | | | | | | | | | | | |
| 1 | A1050 | 100 | — | 5 | 80 | 10 | 10 | 40 | Al — 1.2 Mn - 1.5 Zn | o* | o*** |
| 2 | A3003 | ↑ | — | 10 | 90 | ↑ | — | ↑ | ↑ | o | o |
| 3 | Al - 0.5 | 70 | 30 | 10 | 90 | ↑ | — | 50 | ↑ | o | o |

TABLE 1-continued

Evaluations of Capability of Brazing and Corrosion Resistance Resistance (with fins having a wall thickness of 0.14 mm)

| No. | Material of Multi-hole tube | Chemical Composition (wt %) and Thickness (μm) of First layer | | | Chemical Composition (wt %) and Thickness (μm) of Second layer | | | | Chemical Composition (wt %) of Material of Fins (wt %) | Capability of Brazing | Corrosion Resistance |
|---|---|---|---|---|---|---|---|---|---|---|---|
| | | Zn | Al | Thickness | Al | Si | Zn | Thickness | | | |
| 4 Prior Art | wt % Cu ↑ | 40 | 60 | 5 | 80 | ↑ | 10 | 40 | ↑ | o | o |
| 5 | A1050 | — | — | — | 90 | ↑ | — | 50 | ↑ | o | x*** |
| 6 | A3003 | — | — | — | 80 | ↑ | 10 | 40 | ↑ | o | x |
| 7 | ↑ | 100 | — | 40 | — | — | — | — | ↑ | x** | o |

*Indicates excellent brazing.
**Indicates inferior brazing.
***Corrosion resistance is evaluated whether or not leakage occurred in CASS test for 720 hours.
o Indicates no leakage, and x indicates that leakage occurred.

As is clear from the table, the heat exchanger of the present invention has both excellent corrosion resistance and superior brazing in comparison with a conventional heat exchanger having only a coating layer of a brazing material or only another coating layer of Zn.

Table 2 shows the results of experiments with respect to the bucking of the fins which experiments were conducted with the wall thickness of the fins 2 being varied from 0.14 mm to 0.06 mm.

TABLE 2

| Wall thickness of Fins (mm) | Generation of Buckling of Fins | |
|---|---|---|
| | Present Invention | Prior Art |
| 0.14 | o* | o |
| 0.12 | o | x** |
| 0.10 | o | x |
| 0.08 | o | x |
| 0.06 | x | x |

*Indicates that no buckling occurred.
**Indicates that buckling occurred.

As can be seen from Table 2, in the conventional heat exchanger in which the brazing material is bonded to the surface of the fins by cladding, buckling of fins occurred when the wall thickness thereof becomes 0.12 mm or less. On the other hand, in the aluminum alloy heat exchanger of the present invention in which the brazing material is coated not on the fins but on the multi-hole tube, the buckling occurred only when the wall thickness of the fins was reduced to 0.06 mm or less, making the aluminum alloy heat exchanger of the present invention very effective in reducing the weight of the product.

Figure 3:
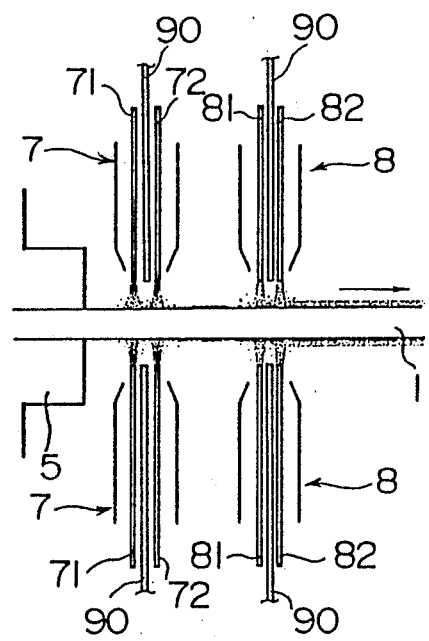
FIG. 3 schematically illustrates the processes of forming a coated layer in the manufacture of a multihole tube used for an aluminum alloy heat exchanger.
Figure 4:
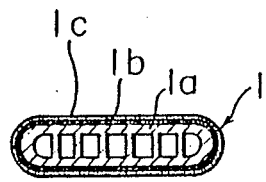
FIG. 4 is a cross-sectional view of the multihole tube with the coated layer formed thereon.
Figure 5:
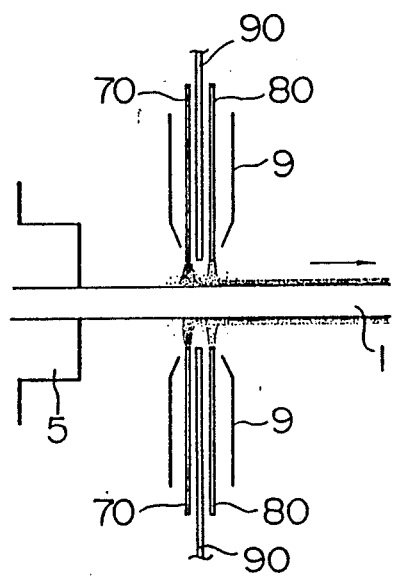
FIG. 5 schematically illustrates the processes of forming a coated layer, showing another embodiment of the present invention.

In the above-described embodiment, two-stage spraying was conducted by using four spray guns, as shown in FIG. 3. However, the first coated layer 1b and the second coated layer 1c may also be formed by using two spraying guns 9, as shown in FIG. 5. In FIG. 5, a wire rod 70 of Zn or an alloy of Zn and Al and a wire rod 80 of a brazing alloy both disposed in parallel relation to each other were supplied to each of two spray guns 9. In both the cases of the "arc" spraying shown in FIGS. 2 and 5, no boundary existed between the first and second coated layers 1b and 1c, and the two layers existed in a mixed state.

The above-described embodiments employ a fluoride type flux. However, a chloride type flux may also be used.

Further, in the heat exchanger of the present invention, the first coated layer 1b made of zinc alloy is covered with the second coated layer 1c which is a brazing alloy. Therefore, it is possible to prevent molten zinc from coming off even in a case of vacuum brazing, whereby the effect of improving corrosion resistance can be maintained. The coated layers may also be formed on the core by cladding.

As will be understood from the foregoing description, the brazing aluminum material according to the present invention can bring about both excellent brazing and superior corrosion resistance in comparison with a conventional one, as is apparent from the evaluations shown in Table 1. Further, the heat exchanger according to the present invention makes reduction in the weight of the product possible because of the fact that it can employ fins having a smaller wall thickness, as can be seen from Table 2.

The aluminum material according to the present invention makes vacuum brazing as well as furnace brazing which is conducted in the atmosphere by using a flux possible.

What is claimed is:

1. A method of manufacturing a brazing aluminum material comprising:
   a first step of forming a core having a predetermined shape by extruding aluminum or an alloy of aluminum;
   a second step of forming a first coated layer by spraying zinc or an alloy of zinc-and-aluminum on the surface of the just extruded core; and
   a third step of forming a second coated layer by spraying a brazing alloy of aluminum and silicon or a brazing alloy of aluminum, silicon, and zinc on the surface of said first coated layer forming a coating having a zinc concentration gradient, wherein said second layer has a melting point higher than said first layer and wherein the outer surface of said second layer has a zinc concentration lower than the inner surface of said first layer.

2. A method of manufacturing an aluminum alloy heat exchanger comprising:
   a first step of forming a tube through which a heat exchange fluid is made to flow by extruding aluminum or an alloy of aluminum;
   a second step of forming a first coated layer by spraying zinc or an alloy of zinc-and-aluminum on the surface of the just extruded core;
   a third step of forming a second coated layer by spraying a brazing alloy on the surface of said first coated layer forming a coating having a zinc concentration gradient, wherein said second layer has a melting point higher than said first layer and wherein the outer surface of said second layer has a zinc concentration lower than the inner surface of said first layer.

a fourth step of forming fins made of aluminum alloy which fins are to be bonded to said tube;

a fifth step of forming an assembly by contacting said fins with said tube with said first and second coated layers being formed thereon; and a sixth step of brazing said tube and said fins by heating said assembly in a furnace to a temperature which is the melting point of said second coated layer or above and which is less than the melting point of said tube.

3. A method of manufacturing an aluminum alloy heat exchanger according to claim 5, wherein said tube is a multi-hole tube having a plurality of holes through which a heat exchange fluid flows, said tube being bent in zigzag shape.

4. An aluminum material for brazing, comprising:

an extruded core made of aluminum or an aluminum alloy;

a first layer sprayed on the surface of said core, said first layer being made of zinc or an alloy of zinc and aluminum; and a second layer sprayed on the surface of said first layer said second layer being made of a brazing alloy of aluminum and silicon or another brazing alloy of aluminum, silicon and zinc and having a melting point higher than said first layer, said first layer and said second layer forming a coated layer which has a gradient of concentration of zinc so that the concentration of zinc existing in the viCinity of the outer surface of the layer is lower than that of zinc existing in the vicinity of an interface defined between the core and the coated layer.

* * * * *